United States Patent
Yang et al.

(10) Patent No.: US 11,126,424 B2
(45) Date of Patent: Sep. 21, 2021

(54) POWER TOOL SYSTEM AND DATA PROCESSING METHOD

(71) Applicant: Nanjing Chervon Industry Co., Ltd., Nanjing (CN)

(72) Inventors: Dezhong Yang, Nanjing (CN); Zhao Hu, Nanjing (CN); Dongyue Wang, Nanjing (CN); Yang Wang, Nanjing (CN); Yunfeng Hu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/850,905

(22) Filed: Apr. 16, 2020

(65) Prior Publication Data
US 2020/0242436 A1 Jul. 30, 2020

Related U.S. Application Data

(63) Continuation of application No. PCT/CN2018/118589, filed on Nov. 30, 2018.

(30) Foreign Application Priority Data

| Nov. 30, 2017 | (CN) | 201711237737.5 |
| Nov. 30, 2017 | (CN) | 201711240293.0 |
| Dec. 21, 2017 | (CN) | 201711392631.2 |

(51) Int. Cl.
*G06F 17/00* (2019.01)
*G06F 8/654* (2018.01)
(Continued)

(52) U.S. Cl.
CPC .......... *G06F 8/654* (2018.02); *A01D 34/006* (2013.01); *A01D 34/008* (2013.01);
(Continued)

(58) Field of Classification Search
CPC ........ G06F 16/00; G06F 16/381; G06F 11/08; G06K 7/0008; G06K 7/0095
(Continued)

(56) References Cited

U.S. PATENT DOCUMENTS

| 9,847,558 B1 * | 12/2017 | Wang | H01M 10/48 |
| 2013/0078149 A1 * | 3/2013 | Holmes | G01N 1/4077 |
| | | | 422/72 |

(Continued)

FOREIGN PATENT DOCUMENTS

| CN | 101068196 A | 11/2007 |
| CN | 103414538 A | 11/2013 |

(Continued)

OTHER PUBLICATIONS

ISA/CN, International Search Report issued on application No. PCT/CN2018/118589, dated Feb. 27, 2019, 3 pages.

*Primary Examiner* — Daniel St Cyr
(74) *Attorney, Agent, or Firm* — Greenberg Traurig, LLP

(57) ABSTRACT

A power tool system includes a power tool; a battery pack detachably connected to the power tool, and a cloud server capable of wirelessly communicating with the power tool. The power tool includes a wireless communication unit configured to establish a wireless communication link with an external device and a file storage unit coupled to the wireless communication unit and configured to store content data in a preset data structure. The preset data structure includes a packet header configured for information transmission, a packet tail including a check bit, and a data packet body including a data length, a data type, a packet serial number, data content and an electronic serial number. A simple and efficient method of deduplicating data is used to release the memory space of the memory and improve data transmission efficiency.

8 Claims, 12 Drawing Sheets

(51) Int. Cl.
*H04W 4/70* (2018.01)
*A01D 34/00* (2006.01)
*H04L 29/06* (2006.01)
*H04L 29/08* (2006.01)
*G06K 17/00* (2006.01)
*G06F 9/4401* (2018.01)
*H04W 12/06* (2021.01)

(52) U.S. Cl.
CPC ...... *G06K 17/0029* (2013.01); *H04L 63/0428* (2013.01); *H04L 63/123* (2013.01); *H04L 67/125* (2013.01); *H04L 67/34* (2013.01); *H04W 4/70* (2018.02); *G06F 9/4401* (2013.01); *H04W 12/06* (2013.01)

(58) Field of Classification Search
USPC .......................................... 235/375, 376, 437
See application file for complete search history.

(56) References Cited

U.S. PATENT DOCUMENTS

| | | | | |
|---|---|---|---|---|
| 2013/0164567 | A1* | 6/2013 | Olsson | ................ H01M 10/425 |
| | | | | 429/7 |
| 2016/0359339 | A1* | 12/2016 | Hwang | ................ H02J 7/0077 |

FOREIGN PATENT DOCUMENTS

| | | |
|---|---|---|
| CN | 103703652 A | 4/2014 |
| CN | 104699101 A | 6/2015 |
| CN | 106056875 A | 10/2016 |
| CN | 106326308 A | 1/2017 |
| CN | 106985688 A | 7/2017 |
| CN | 107070613 A | 8/2017 |
| CN | 107181737 A | 9/2017 |
| JP | 2013186772 A | 9/2013 |

* cited by examiner

POWER TOOL SYSTEM AND DATA PROCESSING METHOD

The present application claims the benefit of and is a continuation of International Application Number PCT/CN2018/118589, filed on Nov. 30, 2018, which application claims the benefit of Chinese Patent Application No. 201711240293.0, filed on Nov. 30, 2017; Chinese Patent application number 201711237737.5, filed on Nov. 30, 2017; and Chinese Patent application number 201711392631.2, filed on Dec. 21, 2017, in the SIPO (State Intellectual Property Office—Chinese Patent Office), each of which is incorporated herein by reference in its entirety.

TECHNICAL FIELD

The present disclosure relates to a power tool system, in particular to a power tool system with a wireless transmission function.

BACKGROUND

With the development of network technologies and the intelligent popularization of mobile communication devices, data connection and sharing between objects through a communication protocol is gradually changing the lives of people.

In the field of power tools, if data transmission can be established between the power tool and a mobile terminal, and between the power tools, it can be of great significance to improve the efficiency of using the power tool, provide a user with personalized control programs, troubleshoot and eliminate potential safety hazards.

SUMMARY

The present disclosure adopts the technical solutions described below.

As an example, described is a power tool system that includes a power tool; a battery pack detachably connected to the power tool to supply electric power to the power tool; and a cloud server capable of wirelessly communicating with the power tool. The power tool includes: a wireless communication unit configured to establish a wireless communication link with an external device; a file storage unit coupled to the wireless communication unit and configured to store content data in a preset data structure. The preset data structure includes: a packet header configured for information transmission; a packet tail including a check bit; and a data packet body including a data length, a data type, a packet serial number, data content, and an electronic serial number. A type of the content data includes real-time data, statistical data, historical data, or control data.

As a further example, described is a data processing method configured for processing content data provided through a record or a communication medium, and includes a step of: storing the content data in a preset data structure. The preset data structure includes: a packet header configured for information transmission; a packet tail including a check bit; and a data packet body including a data length, a data type, a packet serial number, data content, and an electronic serial number. A type of the content data includes real-time data, statistical data, historical data, or control data.

DETAILED DESCRIPTION

The present disclosure will be specifically described below with reference to the drawings and specific examples.

Figure 1:
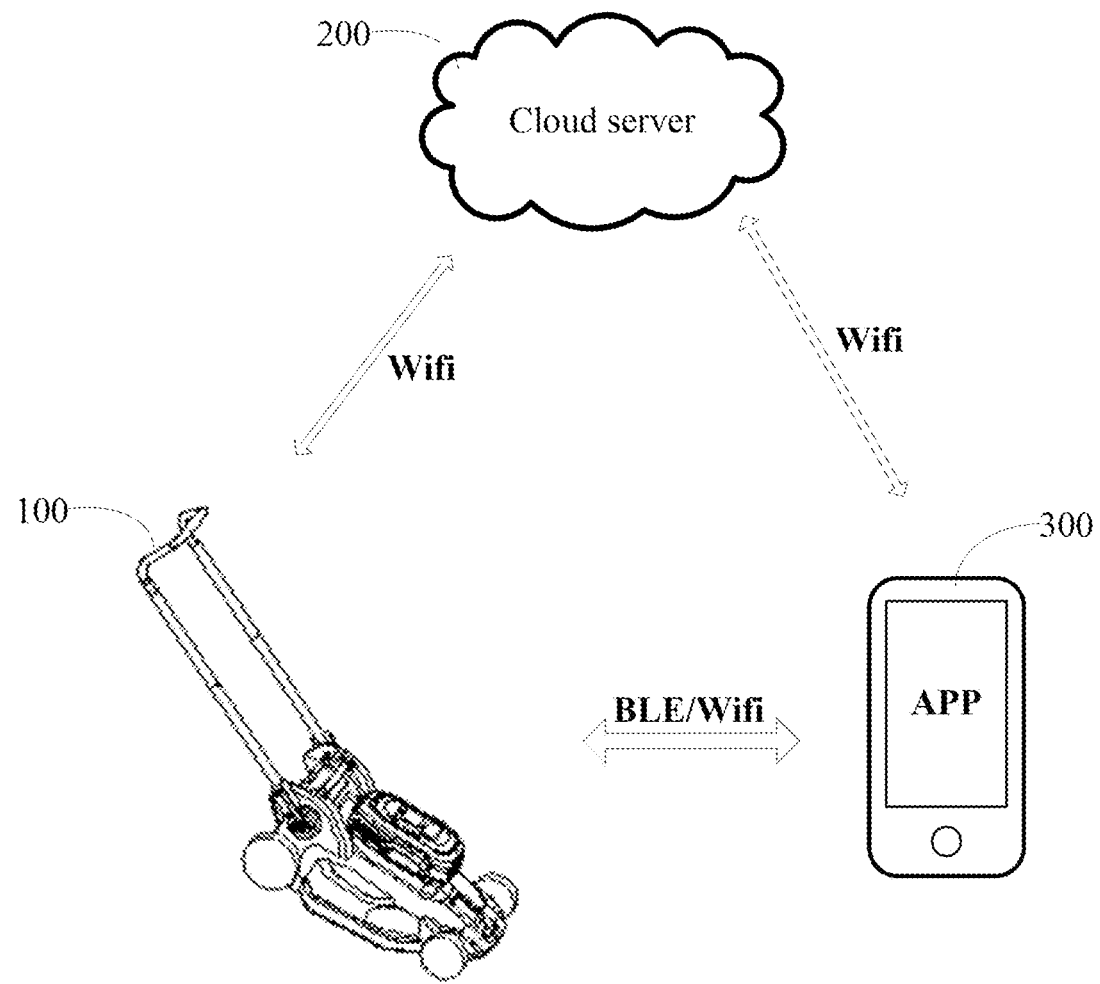
FIG. 1 is a structural view of a power tool system according to an example.
Figure 2:
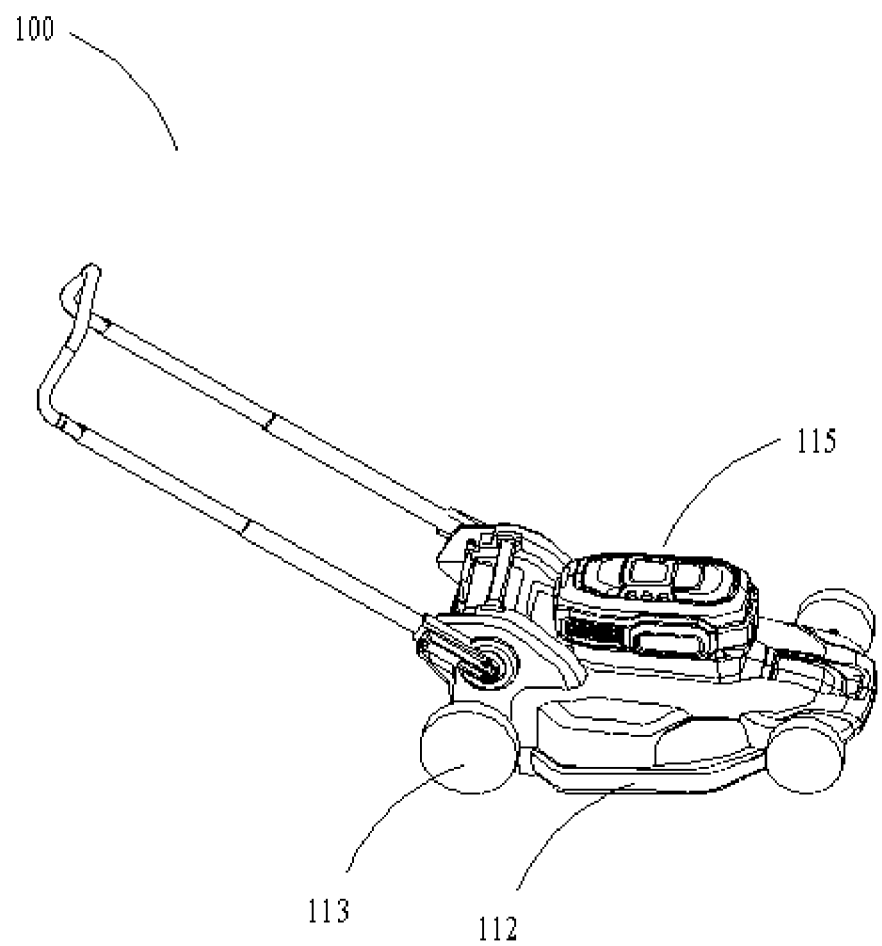
FIG. 2 is a structural view of a lawn mower of FIG. 1.

Referring to FIGS. 1 and 2, a power tool system includes a cloud server 200, a power tool, and a terminal 300.

The cloud server 200 is used at least for upgrading files. The cloud server 200 also has server functions such as sending and receiving files, receiving and issuing instructions, calculation, data processing analysis, and network transmission. The cloud server 200 communicates with an external device wirelessly. The cloud server 200 and the external device adopt WiFi, ZigBee, Narrow Band-Internet of Things (NB-IOT) and other ways to achieve wireless communication. In some examples, WiFi is adopted between the cloud server 200 and the external device to achieve wireless communication. A new upgrade file is written by a developer or service provider into the cloud server 200 for storage.

Referring to FIG. 1, in one example of a power tool, a lawn mower 100 is used as an example for description. The power tool may also be a snowplow, a pruner, a table saw, etc., which is not limited in the present disclosure.

The lawn mower 100 includes a blade, a motor, a chassis 112, a wheel group 113, and a housing assembly. The blade is configured for mowing and the motor drives the blade to rotate. The chassis 112, as a main part of the lawn mower, assembles the parts together. The wheel group 113 is configured for supporting the chassis 112 and can rotate relative to the chassis 112, so that the lawn mower moves relative to the ground. The chassis 112 is formed with a cutting cavity, and the blade is driven by the motor to rotate inside the cutting cavity. The housing assembly at least partially covers the chassis 112.

The lawn mower 100 further includes a battery pack 115 configured for supplying the electric power to the lawn mower as a motive power source of the lawn mower. In some examples, the battery pack is detachably connected to the lawn mower.

In some examples, the lawn mower is a hand-push lawn mower including a handle operation device, and the walking of the lawn mower is achieved by a user operating the handle. In other implementations, the lawn mower includes two motors. One motor is configured for driving the rotation of the blade to achieve the cutting function; the other motor is configured for driving the wheel group 113 to enable the lawn mower to achieve self-walking.

Referring to FIG. 2, the lawn mower 100 further includes a power supply module 120, an information acquisition module 130, a mowing module 140, a self-walking module 150, and an Internet of Things module 160.

The power supply module 120 is configured for converting electric energy provided by the battery pack into electric energy suitable for each module of the lawn mower to supply electric power to each module of the lawn mower. The power supply module 120 includes a lawn mower interface 121, a power supply conversion circuit 122, and a power supply bus interface 123. The lawn mower interface 121 is configured for accessing the battery pack and is electrically connected to the battery pack interface. The power supply conversion circuit 122 is configured for converting electric energy of the accessed battery pack into electric energy having different voltages suitable for each module to supply electric power to each module. The power supply conversion circuit 122 is electrically connected to the lawn mower interface 121.

The information acquisition module 130 is configured for acquiring data information related to the lawn mower, such as a mowing motor current, a mowing motor voltage, a mowing motor rotation speed, a self-walking motor current, a self-walking motor voltage, and a self-walking motor rotation speed. Specifically, the information acquisition module 130 includes an information acquisition unit 131, an information processing unit 132, and an information storage unit 133. In some specific examples, the information acquisition unit 131 includes a current sensor for acquiring the mowing motor current, a voltage sensor for acquiring the mowing motor voltage, or other circuits or devices capable of achieving voltage or current acquisition. The information processing unit 132 is electrically connected to the information acquisition unit 131, and is configured for performing calculation, processing, and the like on data collected by the information acquisition unit 131.

The information storage unit 133 is configured for storing the data related to the lawn mower, the data including, but not limited to, a model of the lawn mower, historical data of the lawn mower, and current and voltage data collected by the information acquisition unit 131.

In some examples, the information storage unit 133 is configured to store the data information related to the lawn mower according to a preset data structure.

Figure 11:
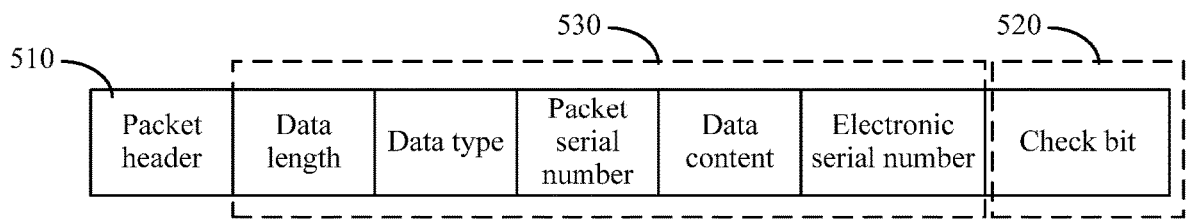
FIG. 11 is a diagram of a data structure according to one example.

As shown in FIG. 11, the preset data structure includes a packet header for information transmission, a packet tail for security check, and a data packet body. The data packet body includes a data length, a data type, a packet serial number, data content, and an electronic serial number. Further, the data type includes real-time data, statistical data, or historical data related to the lawn mower. That is, the same type of data is put into one data structure group, which avoids data space waste caused by duplication of the packet header and the packet tail, thereby saving data storage space.

The mowing module 140 includes a mowing motor drive unit 141, a mowing storage unit 142, a mowing bus interface 143, and a mowing control unit 144. The mowing motor drive unit 141 is connected to a mowing motor 111$a$, and is configured for driving the mowing motor to rotate so as to drive the blade to perform cutting. The mowing control unit 144 is configured for outputting a control signal to the mowing motor drive unit 141 so that the mowing motor drive unit 141 can drive the mowing motor at a preset frequency.

The mowing storage unit 142 is configured for storing data related to a cutting function of the lawn mower, such as historical data, statistical data, and related application programs of the mowing motor.

In some examples, the mowing storage unit 142 is configured for storing the data related to the cutting function of the lawn mower. The mowing storage unit 142 is configured to store the data related to the lawn mower cutting according to a data structure shown in FIG. 11.

The self-walking module 150 includes a self-walking motor drive unit 151, a self-walking storage unit 152, a self-walking bus interface 153, and a self-walking control unit 154. The self-walking motor drive unit 151 is connected to the self-walking motor, and is configured for driving the self-walking motor to rotate so as to drive the wheel group 113 to achieve the self-walking of the lawn mower. The self-walking control unit 154 is configured for outputting a self-walking control signal to the self-walking motor drive unit 151 to enable the self-walking motor drive unit 151 to drive the self-walking motor to rotate and thus achieve the self-walking of the lawn mower.

The self-walking storage unit 152 is configured for storing data related to the lawn mower self-walking, such as position coordinates of the lawn mower, a built-in mowing map, and a rotation speed of the self-walking motor. The self-walking storage unit 152 is configured to store the data related to the lawn mower self-walking according to a data structure shown in FIG. 11.

The Internet of Things module 160 includes a wireless communication unit 161, a file storage unit 162, an Internet of Things bus interface 163, an Internet of Things check unit 164, a network distribution unit 165, and an Internet of Things processing unit 166. The wireless communication unit 161 is configured for wirelessly communicating with the cloud server and the terminal. Specifically, the wireless communication unit 161 receives an instruction from the terminal and/or a file issued by the cloud server. The instruction from the terminal includes, but is not limited to, an upgrade confirmation instruction from the terminal, acquisition of electric quantity information of the battery pack such as remaining electric quantity of the battery pack and remaining usage duration of the battery pack, and a self-walking trajectory of the lawn mower. The file issued by the cloud server includes, but is not limited to, an upgrade file and an application program which are configured for upgrading each module in the lawn mower, an upgrade file or each data packet configured for the battery pack upgrade.

In some examples, the wireless communication unit 161 includes the Internet of Things processing unit 166 (e.g., a Bluetooth) and WiFi 167. A wireless connection is established between the lawn mower and the cloud server through WiFi, and a wireless connection is established between the lawn mower and the terminal through the Bluetooth. When the WiFi signal is poor, the communication between the terminal and the lawn mower is established through the Bluetooth, which improves the user experience and reduces the power consumption of the lawn mower.

Figure 3:
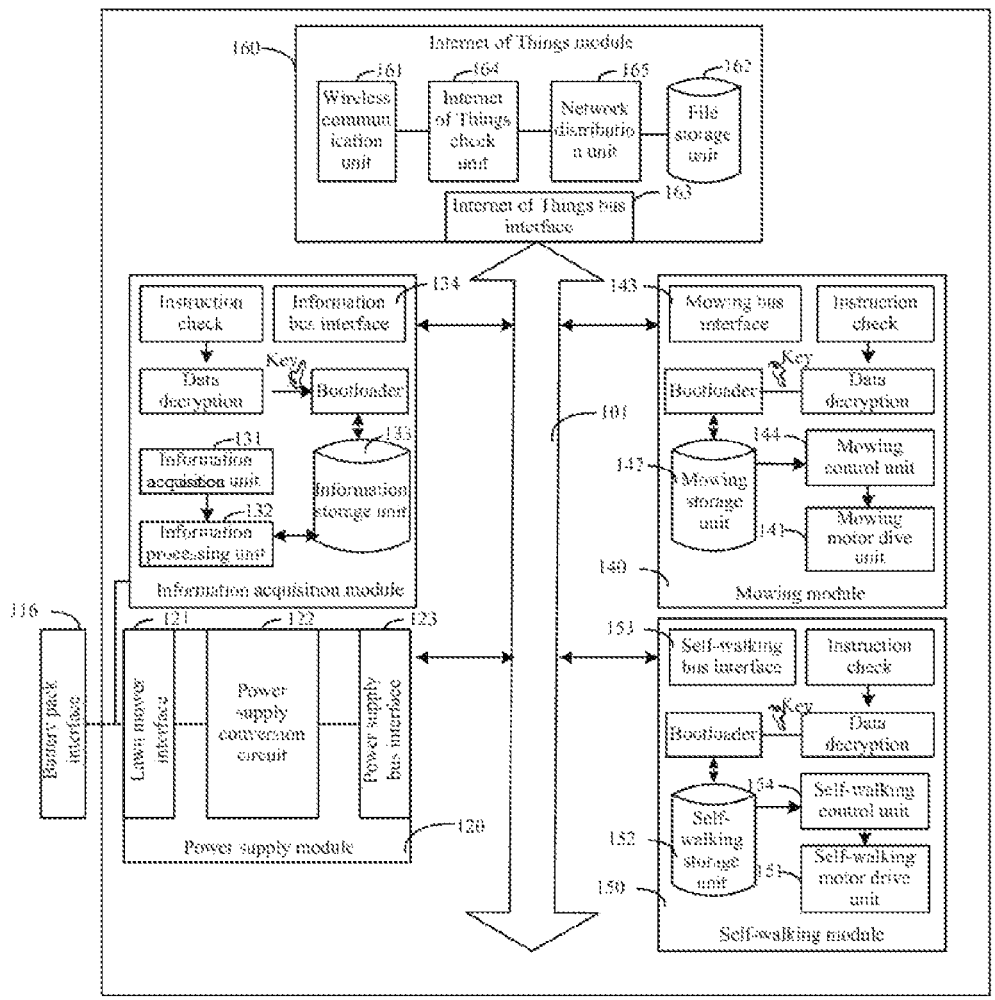
FIG. 3 is a block diagram of an internal structure of a lawn mower of FIG. 1.
Figure 4:
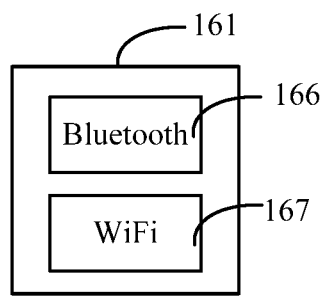
FIG. 4 is a structural view of a wireless communication unit of FIG. 3.

Referring to FIG. 3, the Internet of Things bus interface 163, the power supply bus interface 123, the mowing bus interface 143, and the self-walking bus interface 153 are all mounted on a bus to achieve information interaction and data transmission between the modules through the bus 101.

Information scheduling is established between the Internet of Things module 160 and the modules through the bus, each module simultaneously shares the upgrade file issued by the Internet of Things module 160 through the bus, and the Internet of Things module 160 can simultaneously receive a bus allocation request sent by each module, which effectively ensures that each module sends the data in a timely manner, avoids delays, and improves the overall transmission efficiency of the system and the effect of real-time data transmission.

In some examples, the wireless communication unit 161 receives an upgrade instruction from the terminal and issues the received upgrade instruction to the mowing module 140 to upgrade the mowing module 140. In some examples, the wireless communication unit 161 receives the upgrade instruction from the terminal and issues the received upgrade instruction to the self-walking module 150 to upgrade the self-walking module 150. In other examples, the wireless communication unit 161 receives the upgrade instruction from the terminal and issues the received upgrade instruction to one or more of the mowing module 140, the acquisition module, and the information acquisition module 130.

In some examples, the file storage unit 162 is configured for storing the upgrade file issued by the cloud server, and after receiving the upgrade instruction that confirms the upgrade, issuing the upgrade file to corresponding modules in the lawn mower so that the corresponding modules can be upgraded according to the upgrade file. In some examples, after receiving the upgrade instruction that confirms the upgrade, the Internet of Things module 160 enables the file storage module to store the upgrade file issued by the cloud server first, and then issues the upgrade file to the corresponding modules in the lawn mower after the download of the upgrade file is completed. Specifically, the Internet of Things module 160 includes an Internet of Things processor, and the Internet of Things processor is configured for receiving the upgrade instruction from the terminal or issuing the upgrade instruction to the mowing module 140 and/or the self-walking module 150. Since the lawn mower and the cloud server communicate through wireless manners such as WiFi, the upgrade file is first downloaded and stored in the file storage unit 162 and then the upgrade file in the file storage unit 162 is called to upgrade the corresponding modules, so that the problem that the lawn mower may fail to be upgraded when the network is unstable is avoided. Further, after the upgrade file is downloaded successfully, that is, after a complete upgrade packet of the upgrade file is stored in the file storage module, even if the lawn mower is disconnected from the network, the corresponding modules of the lawn mower can be updated and upgraded.

The Internet of Things check unit 164 is configured for performing identity check on the received data. For example, whether a data baud rate matches and whether an upgrade data packet is complete are checked.

The network distribution unit 165 is configured for enabling the lawn mower to establish network connections with the cloud server and the terminal, separately. In some examples, the wireless communication unit 161 includes the Bluetooth and WiFi, and the network distribution unit 165 is configured for selectively enabling the lawn mower 210 to be connected to the terminal in the wireless manner of the Bluetooth or WiFi. Preferably, in condition that the network distribution unit 165 detects that both the Bluetooth and WiFi are available, the Bluetooth manner is preferred, that is, the lawn mower and the terminal are connected through the Bluetooth, which has the advantage of reducing the power consumption of the lawn mower and the terminal, responding faster, and improving the user experience.

Specifically, the network distribution unit 165 is configured to detect whether the Bluetooth and WiFi are both in an effective state, and the Bluetooth is activated when both the Bluetooth and WiFi are in the effective state. After the Bluetooth is activated, an access authentication request is sent to the terminal to authenticate the terminal. After receiving the access authentication request of the Bluetooth unit, the terminal responds to the access authentication request by using a preset authentication method; the Bluetooth receives the authentication response of the access of the terminal and makes authentication matching to the terminal, and in response to determining that the matching is successful, the Bluetooth unit will open an access permission of the terminal to enable establishment of the Bluetooth connection between the lawn mower and the terminal, so as to achieve data transmission and communication.

In condition that a problem exists in the software of the lawn mower or when it is necessary to update the program or upgrade the software of the shipped product, it is usually necessary to disassemble the machine to change the product software, which brings a lot of inconvenience to product development and use by the user. Therefore, a more convenient and faster software upgrade method needs to be designed for the lawn mower.

Figure 5:
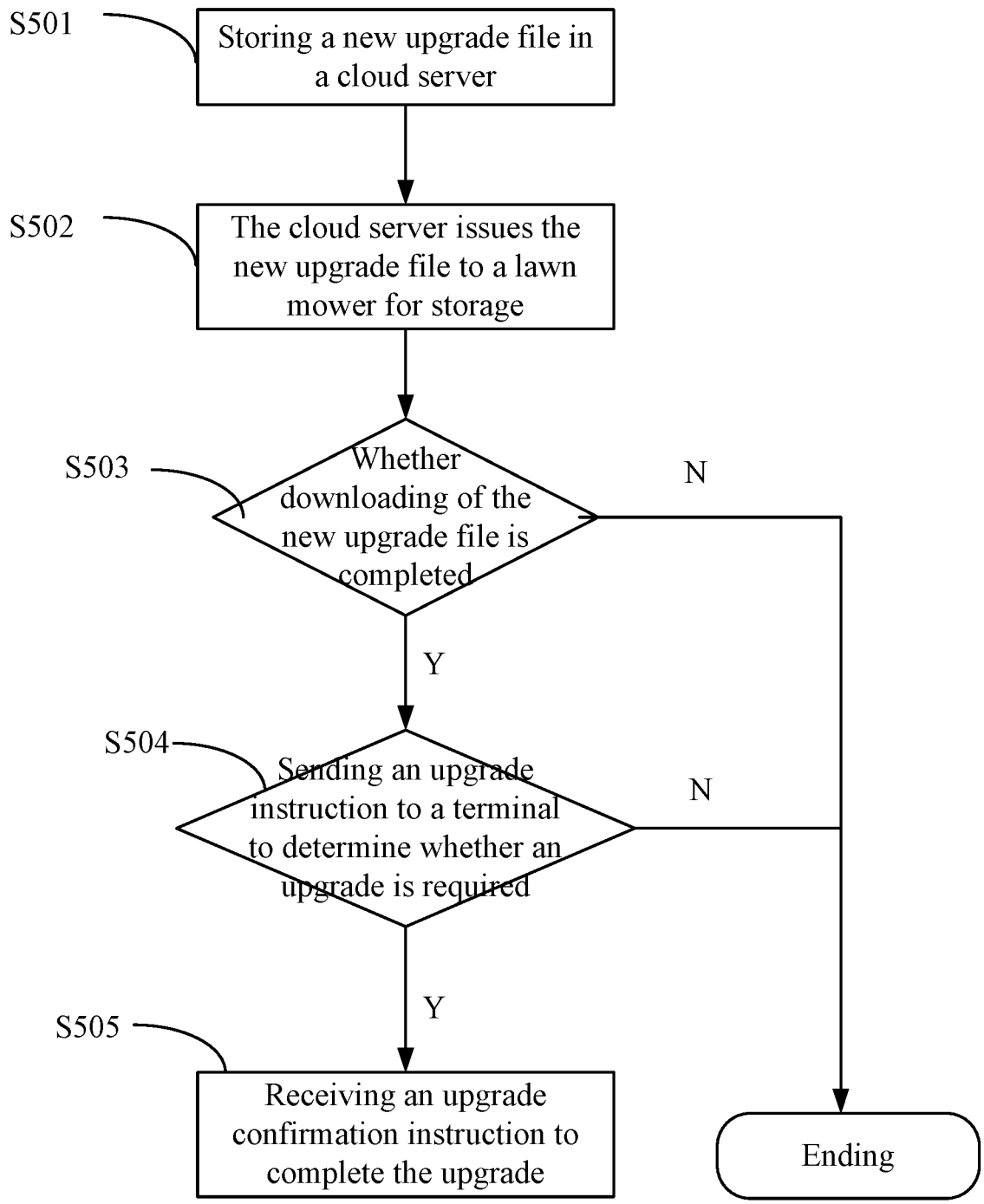
FIG. 5 is a flowchart of a software upgrade method for a lawn mower system according to an example.

Referring to FIG. 5, a software upgrade method for the lawn mower system mainly includes the steps described below:

In S501, a new upgrade file is stored in a cloud server;

Specifically, the developer writes the new upgrade file to the cloud server for storage. In some examples, the upgrade file is an upgrade file for upgrading one of a mowing module 140, an information acquisition module 130, or a self-walking module 150. In some examples, the upgrade file is an upgrade file for upgrading any combination or all modules of the mowing module 140, the information acquisition module 130, or the self-walking module 150. In some examples, the upgrade file is an upgrade file for upgrading a battery pack. In some examples, the upgrade file includes an upgrade data packet for upgrading each module in the lawn mower or an upgrade data packet for upgrading the battery pack.

The upgrade file includes upgrade object information (such as one or more of a type, a model, and a code of a product), file version information, and file check information.

In S502, the new upgrade file is issued by the cloud server to the lawn mower for storage.

In this step, after a wireless connection is established between the lawn mower and the cloud server, the new upgrade file is issued to the lawn mower in a manner of wireless transmission, for example, in a manner of wireless transmission of WiFi, NB-IOT, and LoRa.

The new upgrade file is stored in the lawn mower. Specifically, the new upgrade file is stored in an Internet of Things module 160. More specifically, the Internet of Things module 160 is provided with a flash memory for storing the new upgrade file, and the new upgrade file is stored in the flash memory.

In S503, whether downloading of the new upgrade file is completed is determined, if the downloading of the new upgrade file is completed, step S504 is performed, and if downloading of the new upgrade file is not completed, the process ends.

In S504, an upgrade instruction is sent to a terminal 300 to determine whether an upgrade is required, if the upgrade is required, step S505 is performed, and if the upgrade is not required, the process ends.

In this step, after the downloading of the new upgrade file is completed, the lawn mower sends the upgrade instruction to the terminal 300. Specifically, the upgrade instruction is sent to the terminal through the Internet of Things module 160 in a wireless communication manner. In some examples, the Internet of Things module 160 includes a WiFi unit and a Bluetooth unit, and the lawn mower and the terminal perform data transmission through the Bluetooth, that is, the lawn mower sends the upgrade instruction to the terminal 300 through the Bluetooth. The advantage is that the power consumption of the lawn mower can be reduced.

The terminal is a mobile device such as a mobile computer and a mobile phone, and includes a display device that can be operated by a user. After receiving the upgrade instruction transmitted by the lawn mower, the terminal displays the upgrade instruction transmitted in a graphic form on the display device for the user to choose whether or not the upgrade is needed. If the user confirms the upgrade, the process goes to step S505, and if the user does not confirm the upgrade, the process ends.

In S505, an upgrade confirmation instruction is received to complete the upgrade.

In this step, the lawn mower receives the upgrade confirmation instruction from the terminal in the wireless manner. The Internet of Things module 160 responds to the upgrade confirmation instruction, calls the new upgrade file stored in a file storage unit 162, and issues the new upgrade file to the corresponding module to be upgraded to complete the upgrade.

Another software upgrade method for the lawn mower system mainly includes the steps described below.

In S511, a new upgrade file is stored in a cloud server.

In S512, an upgrade instruction is sent to a terminal 300 to determine whether an upgrade is required, if the upgrade is required, step S513 is performed, and if the upgrade is not required, the process ends.

In S513, the new upgrade file is issued by the cloud server to the lawn mower for storage.

In S514, whether downloading of the new upgrade file is completed is determined, if the downloading of the new upgrade file is completed, step S515 is performed, and if the downloading of the new upgrade file is not completed, the process ends.

In S515, the upgrade file is updated to complete the upgrade.

The difference from the above software upgrade method is that the terminal first confirms whether to upgrade, and if the upgrade is required, the cloud server issues the new upgrade file to the lawn mower for storage.

In the above upgrade method, the new upgrade file is stored in the Internet of Things module 160 before upgrade, so that even when the network signal is unstable, the upgrade can be completed as long as the upgrade file has already been stored in the Internet of Things module 160. Compared with the upgrade method of downloading and upgrading at the same time, this method avoids data information redundancy while improving the upgrade efficiency, and the storage space of the Internet of Things module 160 is released.

How to update or upgrade a program in the lawn mower is described in detail below. A manner of a boot loader (Boot Load) is used in the lawn mower to update or upgrade the program.

The boot loader is an operation of a microcontroller on part of its own flash memory to update an application program, thereby achieving software update or upgrade. In this way, a reserved communication interface can be configured for communicating with each module inside the lawn mower, so that each module calls the boot loader to update the application program, thereby achieving firmware update and upgrade of the lawn mower. The modules here include the Internet of Things module 160, an acquisition module, a self-walking module 150, and the like inside the lawn mower. In some specific examples, the modules include a programmable Micro Controller Unit (MCU) and the flash memory, and the boot loader is stored in the flash memory.

Figure 6:
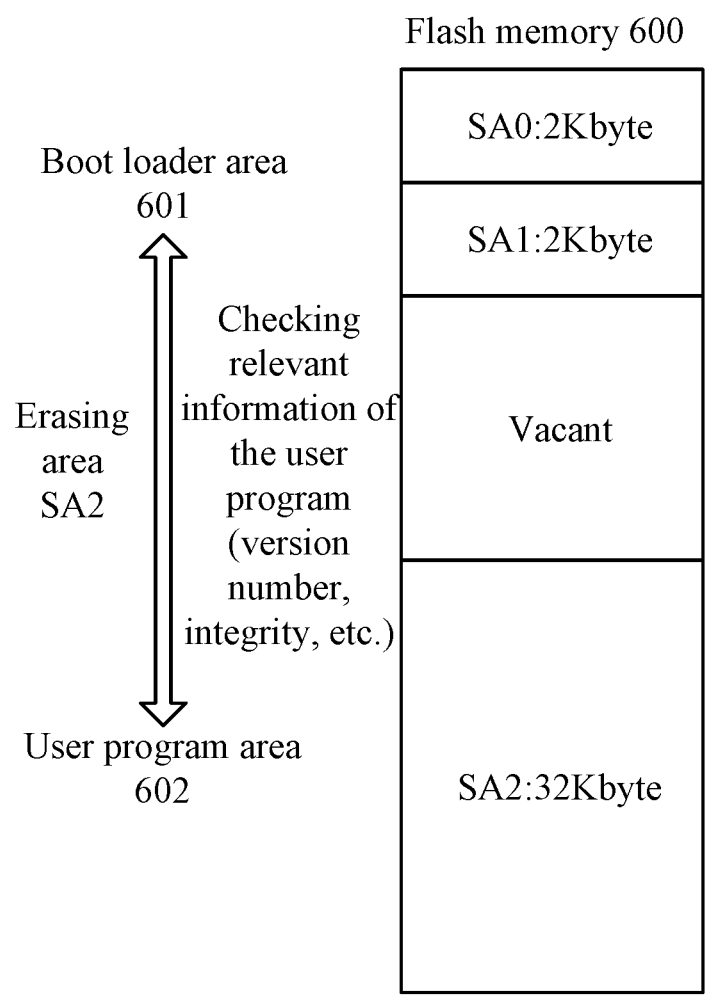
FIG. 6 is a diagram of an internal structure of a boot loader as one example.

Referring to FIG. 6, a structural view of the boot loader is shown. The boot loader includes a boot loader area 601 and a user program area 602. The boot loader area receives external data and instructions in a manner of communication, checks information about the user program area (for example, whether a file is complete, version information, etc.) and updates an application program stored in the user program area. The user program area is configured for storing the application program, that is, an application program code. The flash memory distributes storage spaces to the boot loader area and the user program area respectively according to the actual situation. As shown in FIG. 6, the flash memory distributes two storage spaces, SA0 and SA1, to the boot loader area, and distributes storage area SA2 to the user program area. The flash memory can also store other information related to the lawn mower system 10 in area SA3.

The boot loader has read and write functions, can read the data information stored in the flash memory, can also write the data information into the memory, and can also cover all the application programs stored in the flash memory, and then write a new program. The boot loader 601 performs reading, writing, and/or erasing by calling some commands of predetermined functions. For example, the read command "R" can be called to read the data information in the flash memory 600, and the erase command "E" can be called to erase any or all of the memory segments. The write command "W" can be called to write data to any or all memory segments.

An executable program stored in the flash memory 600 of the MCU by the boot loader 601 can read data in the flash memory 600 or write data to the flash memory. In condition that the application program stored in the flash memory 600 needs to be updated, a new application program 602 can be written into the user program area by using the boot loader 601 to replace an original application program with the new application program.

Due to the fact that the boot loader 601 and the application program are both stored in the flash memory 600 of the MCU, if an address of the program called by the MCU is wrong, the MCU may mistakenly execute the boot loader 601. In order to solve this problem, in actual operation, an upgrade key may be introduced to solve the problem, and the program update and upgrade is performed when the upgrade key matches.

In the above lawn mower system, the software update and upgrade of the battery pack and the lawn mower 210 can be performed through the boot loader.

Figure 7:
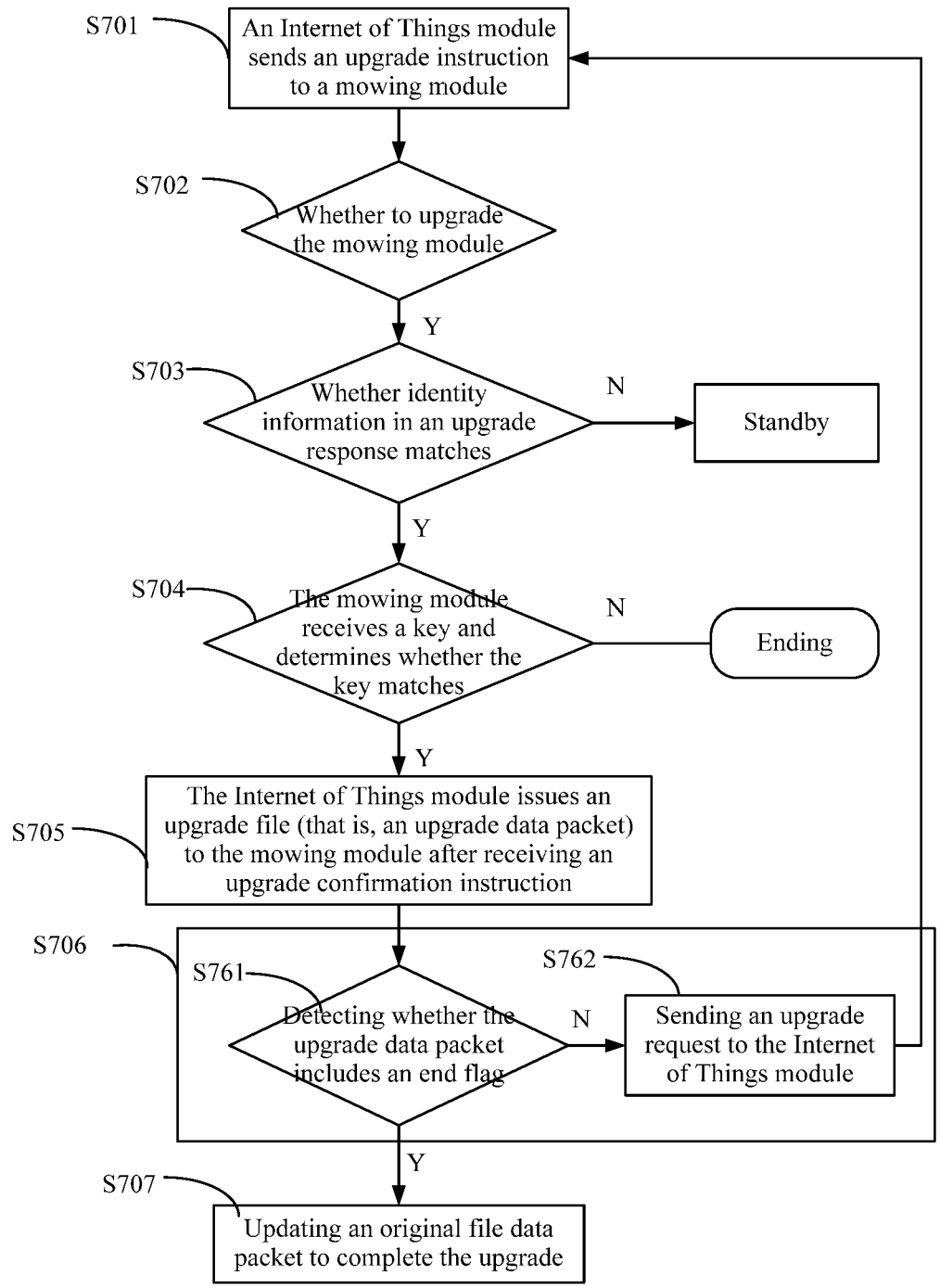
FIG. 7 is a flowchart of a software upgrade method for a lawn mower module of a lawn mower according to one example.

The lawn mower is used as an example to explain the method of program update and software upgrade of the lawn mower through the boot loader. The communication connection is established between each module and the Internet of Things module 160 in the lawn mower through the bus and the Internet of Things module 160 can use a bus scheduling method to selectively perform file upgrade and software update on any one or more modules mounted on the bus. For convenience of description, referring to FIG. 7, a mowing module 140 is used as an example to explain an upgrade process of the Internet of Things module 160 scheduling the mowing module 140.

A method for file upgrade of the mowing module 140 in the lawn mower includes the steps described below.

In S701, the Internet of Things module 160 sends an upgrade instruction to the mowing module 140.

In S702, the mowing module 140 receives the upgrade instruction and determines whether to upgrade the mowing module 140; If the mowing module 140 is to be upgraded, an upgrade response (including identity information of the mowing module 140) is sent to the Internet of Things module 160; if the mowing module 140 is not to be upgraded, the mowing module 140 enters a standby state.

In S703, the Internet of Things module 160 determines whether the identity information in the upgrade response matches; if the identity information in the upgrade response matches, a key is sent to the mowing module 140.

In S704, the mowing module 140 receives the key and determines whether the key matches. If the key matches, the mowing module 140 enters the upgrade state and sends an upgrade confirmation instruction to the Internet of Things module 160; if the key does not match, the process ends.

In S705, the Internet of Things module 160 issues an upgrade file (that is, an upgrade data packet) to the mowing module 140 after receiving the upgrade confirmation instruction. In S706, the mowing module 140 receives the upgrade data packet until the upgrade data packet is completely issued.

In S707, an original file data packet is updated to complete the upgrade.

An exception may occur during the upgrade process, causing one of the modules to receive an incomplete upgrade file, thereby affecting the upgrade of the module. Then, this problem can be solved by setting an upgrade end flag. Specifically, the upgrade file, that is, the upgrade data packet includes an end flag. In one of the specific examples, step S706 further includes the sub-steps described below.

In S761, whether the upgrade data packet includes the end flag is detected; if the upgrade data packet does not include the end flag, the mowing module 140 performs step S762; if the upgrade data packet includes the end flag, step S707 is performed.

In S762, an upgrade request is sent to the Internet of Things module 160, and the Internet of Things module 160 receives the upgrade request and returns to step S701 to continue performing step S701 until the upgrade is completed.

In step S762, the upgrade request includes node identity information indicating the mowing module 140, and the Internet of Things module 160 can read the node identity information and schedule the corresponding upgrade file to be issued.

In this way, the success rate of the module upgrade is further improved.

The mowing module 140 is merely used as an example for illustration. Other modules in the lawn mower, such as the self-walking module 150 and the information acquisition module 130, can be upgraded in the same way. The Internet of Things module 160 can also issue a plurality of upgrade data packets to modules at the same time through the bus, so that each module can complete its own file upgrade.

Each module in the lawn mower works in cooperation with each other. In order to ensure the safe use of the lawn mower, each module in the lawn mower is configured to perform the operations described below: in condition that any module enters the upgrade state, the other modules enter the standby state.

Figure 8:
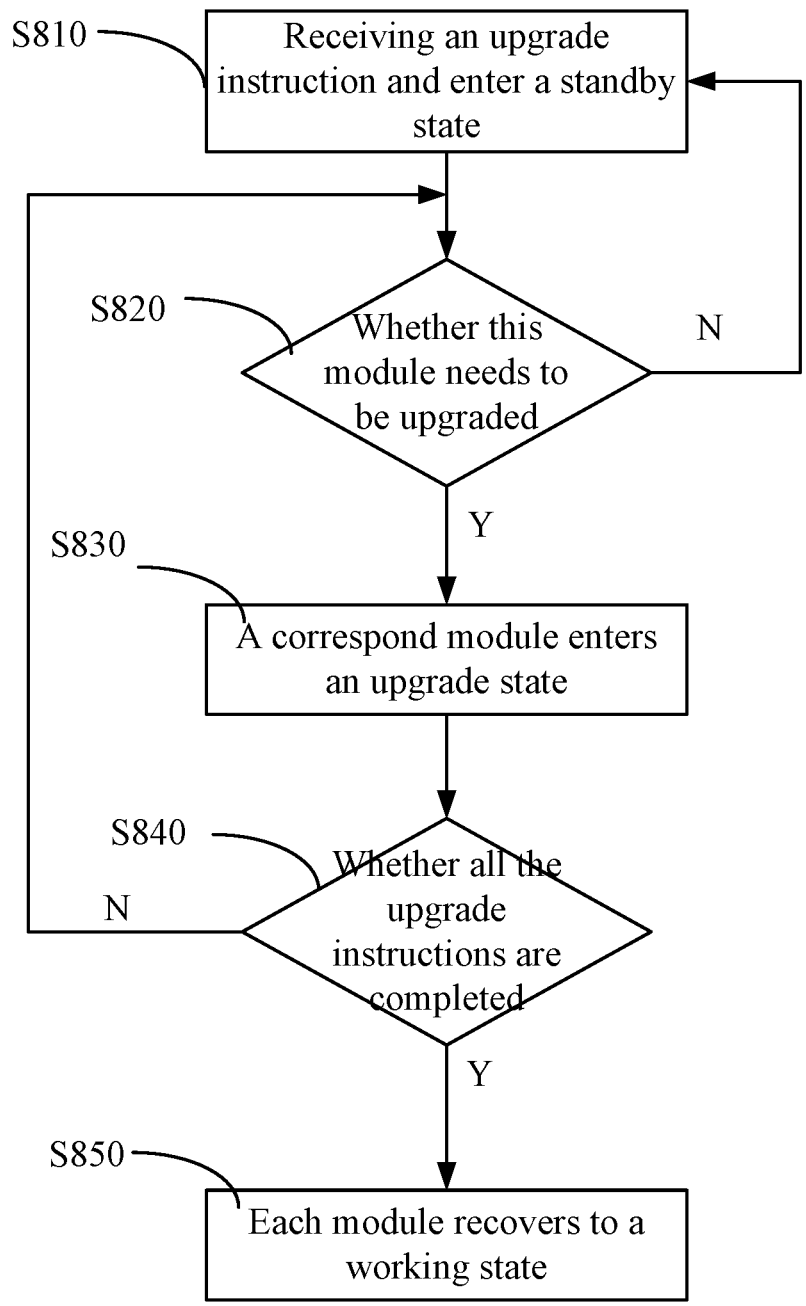
FIG. 8 is a flowchart of upgrade of each module in a lawn mower according to one example.

In one of the specific examples, the Internet of Things module 160 sends the upgrade instruction to each module through the bus. Referring to FIG. 8, each module is configured to perform the operations described below.

In S810, the upgrade instruction is received and the standby state is entered.

In S820, whether this module needs to be upgraded is determined separately, if this module needs to be upgraded, step S830 is performed, and if this module does not need to be upgraded, the standby state continues to be maintained.

In S830, the corresponding module enters the upgrade state.

In S840, whether all the upgrade instructions are completed is determined, if all the upgrade instructions are completed, the process goes to step S850; if all the upgrade instructions are not completed, the process returns to step S820.

In S850, each module recovers to the working state.

The Internet of Things module 160 sends the upgrade instruction to each module through the bus, and the upgrade instruction includes a target address of the module to be upgraded, an identifier, an upgrade file version number, an upgrade data packet, and the like.

In some examples, the Internet of Things module 160 includes an Internet of Things processor configured to issue the upgrade instruction to each module in a preset order, and each module is separately upgraded in the preset order.

The battery pack is connected to the lawn mower, the lawn mower is powered on, and an electrical connection and a communication connection are established between the battery pack and the lawn mower. Specifically, the information is transmitted through a communication connection established between a communication terminal of the battery pack and a communication terminal of the lawn mower. In some specific examples, the lawn mower system can upgrade the battery pack without adding an additional Internet of Things module 160 to the battery pack.

Figure 9:
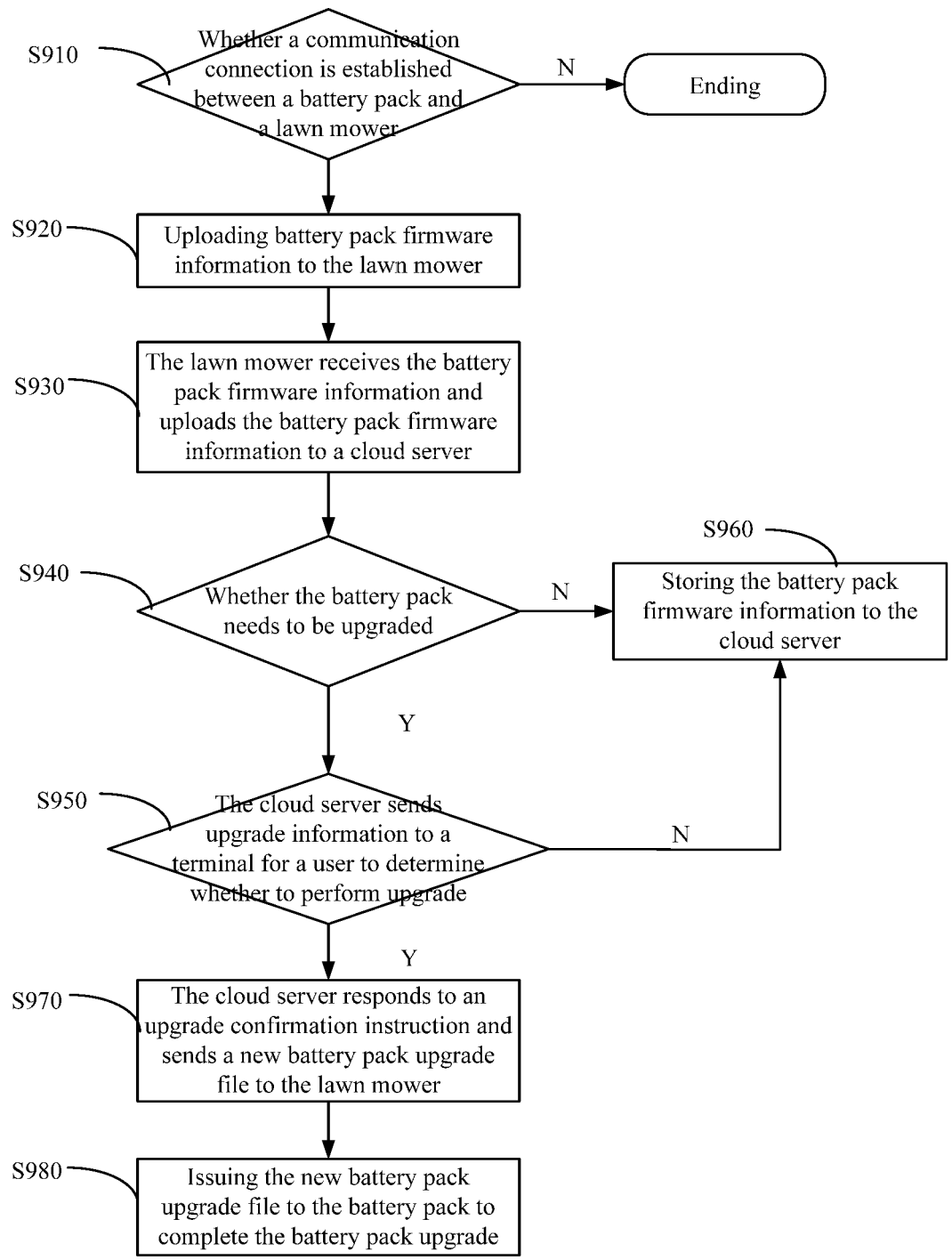
FIG. 9 is a flowchart of an upgrade method for a battery pack in a lawn mower system according to one example.

Referring to FIG. 9, a method for upgrading the battery pack in the lawn mower system according to an example includes the steps described below.

In S910, whether the communication connection is established between the battery pack and the lawn mower is determined, if the communication connection is established between the battery pack and the lawn mower, step S920 is performed, and if the communication connection is not established between the battery pack and the lawn mower, the process ends.

In this step, the battery pack is coupled to the lawn mower, and the lawn mower determines whether the communication connection is established between the battery pack and the lawn mower. For example, whether the communication connection is established is determined by detection of a change in an electric signal between the battery pack and the lawn mower.

In S920, battery pack firmware information is uploaded to the lawn mower.

In this step, the battery pack uploads its own battery pack firmware information to the lawn mower through the communication terminal of the battery pack and the communication terminal of the lawn mower. The battery pack firmware information includes a battery pack model, a rated voltage, a historical version model, a battery pack life, electric quantity, and other information.

In S930, the lawn mower receives the battery pack firmware information and uploads the battery pack firmware information to the cloud server;

In this step, the lawn mower receives the battery pack firmware information and uploads the battery pack firmware information to the cloud server wirelessly through the Internet of Things module 160. In some examples, the battery pack firmware information is uploaded to the Internet of Things module 160 through the bus, and is directly uploaded to the cloud server wirelessly through the Internet of Things module 160. The advantage is that the battery pack firmware information does not need to be stored in the lawn mower, saving the memory space of the lawn mower.

In S940, whether the battery pack needs to be upgraded is determined, if the battery pack needs to be upgraded, step S950 is performed, and if the battery pack does not need to be upgraded, step S960 is performed.

In this step, the cloud server determines whether the battery pack needs to be upgraded. For example, if a new battery pack upgrade file is written to the cloud server, a version number of the new battery pack upgrade file is compared with a version number of the uploaded battery pack file; if the version numbers are consistent, the upgrade is not needed; if the version numbers are not consistent, the battery pack needs to be upgraded.

In S950, the cloud server sends the upgrade information to the terminal, and the user confirms whether to upgrade. If the upgrade is to be performed, step S970 is performed, and if the upgrade is not to be performed, step S960 is performed.

In this step, the cloud server wirelessly sends the upgrade instructions of a need for upgrade to the terminal for users to choose whether to upgrade.

In S960, the battery pack firmware information is stored in the cloud server.

In this step, the battery pack firmware information is stored in the cloud server so that the user can retrieve the required information through the terminal, which is convenient for the user to choose and understand the usage status of the battery pack, for example, the called battery pack information is directly displayed on the terminal.

In S970, the cloud server responds to the upgrade confirmation instruction and issues the new battery pack upgrade file to the lawn mower.

In this step, the new battery pack upgrade file is wirelessly issued to the lawn mower and stored in the Internet of Things module 160.

In S980, the new battery pack upgrade file is issued to the battery pack to complete the battery pack upgrade.

Figure 10:
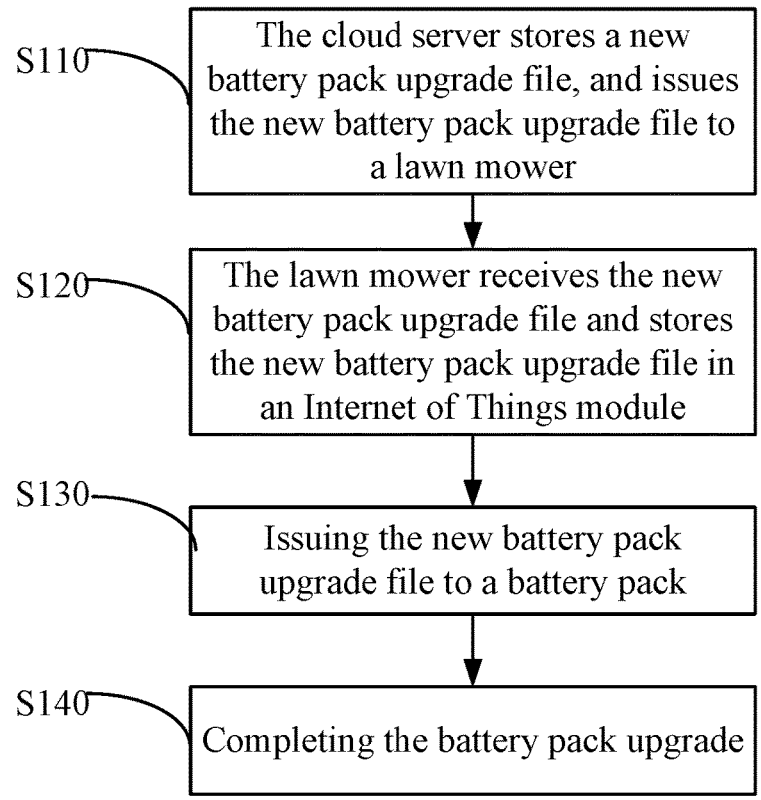
FIG. 10 is a flowchart of an upgrade method for a battery pack in a lawn mower system according to one example.

Referring to FIG. 10, a method for upgrading the battery pack in the lawn mower system according to another example includes the steps described below.

In S110, the cloud server stores the new battery pack upgrade file, and issues the new battery pack upgrade file to the lawn mower.

In S120, the lawn mower receives the new battery pack upgrade file and stores the new battery pack upgrade file in the Internet of Things module 160.

Specifically, the new battery pack upgrade file is stored in a file storage unit 162. In this step and in one example, a step of verifying whether the new battery pack upgrade file is successfully downloaded can be added. For example, the battery pack upgrade file includes an end identifier. If the end identifier can be detected, it indicates that the downloading is successful. If the end identifier fails to be detected, no upgrade operation is performed.

In S130, the new battery pack upgrade file is issued to the battery pack.

Specifically, in this step, the new upgrade file packet stored in the Internet of Things module 160 is issued to a power supply module 120 through the bus, and then transmitted to the battery pack through the communication terminal of the lawn mower and the communication terminal of the battery pack.

In S140, the battery pack upgrade is completed.

In this step, the battery pack receives the new battery pack upgrade file, updates a version of the original battery pack upgrade file, and finally completes the battery pack upgrade.

The terminal is provided with an interactive interface that can be operated by the user. The user can remotely control the lawn mower by operating a corresponding display icon. For example, the user operates the terminal to remotely operate the lawn mower on, off, on and off at regular time, locked and the like. For example, the user selects a corresponding operation interface to call the information related to lawn mower for the user to understand.

The terminal communicates with the lawn mower wirelessly, and can display various information of the lawn mower, such as the output power of the lawn mower, the total remaining charging time, and the self-walking trajectory.

The cloud server includes a cloud storage unit and a cloud processing unit. The cloud processing unit is configured to receive data uploaded by the lawn mower and perform data deduplication processing on the data uploaded by the lawn mower. The cloud storage unit is configured to receive and store battery pack data subjected to deduplication processing by a cloud processor.

Referring to a data storage structure shown in FIG. 11, the data storage structure includes a packet header for information transmission, a packet body, and a packet tail.

The packet body includes a start time, a data length, a data type, data content, an electronic serial number, a packet serial number, and an end time. The lawn mower is turned on and off every time as a data record, the start time is the time corresponding to the turning on of the lawn mower, and the end time is the time corresponding to the turning off of the lawn mower.

The data type includes historical data, real-time data, statistical data, or control data. In one of the specific examples, each data type corresponds to a respective matched code, for example, code X001 represents the statistical data, code X002 represents the historical data, and code X003 represents the real-time data.

The electronic serial number, that is, a device ID, is used to indicate a corresponding device. That is, each device has a unique electronic serial number for easy identification.

The packet tail includes a check bit and so on.

In actual use, every time the lawn mower is on and off, a data record exists, and the same data is possible to be repeatedly written to the memory, which will make a large amount of redundant data stored in the memory to occupy the memory space of the memory. For example, the historical data related to the battery pack is written repeatedly into the cloud memory. Therefore, a simple and efficient method of data deduplication is needed to release the memory space of the memory and improve the efficiency of data transmission.

Figure 12:
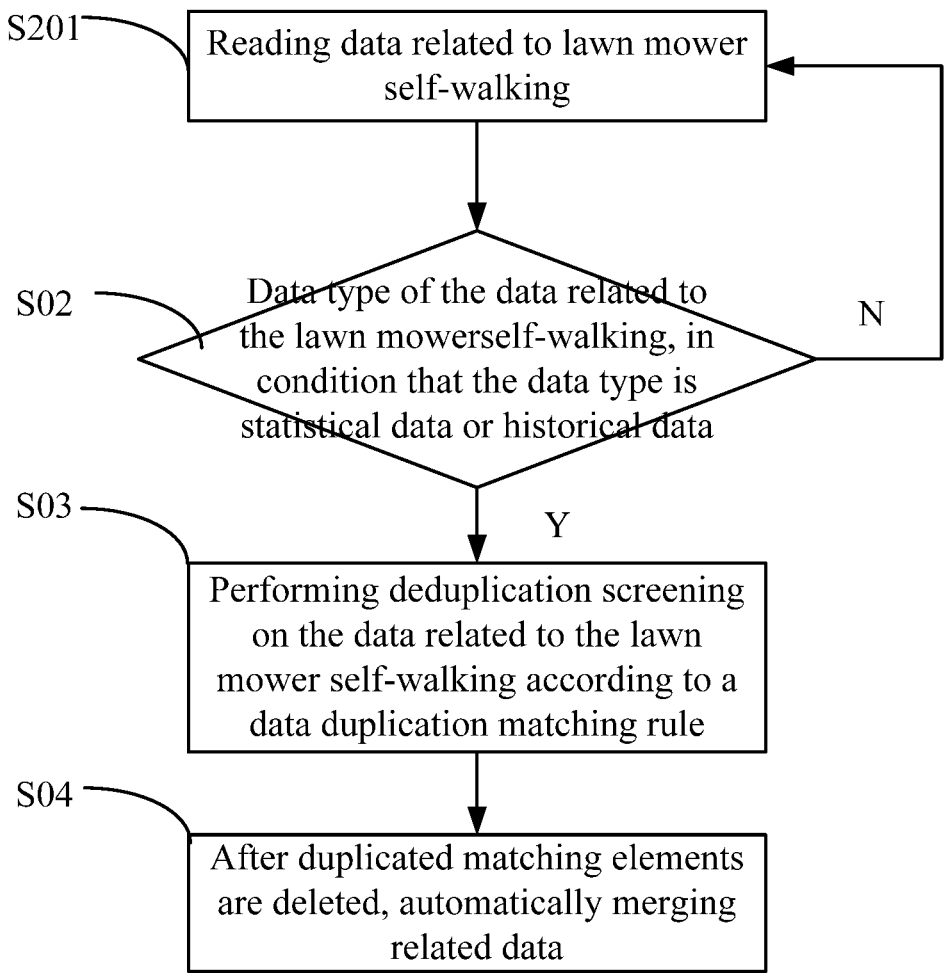
FIG. 12 is a flowchart of a data processing method for a lawn mower system according to one example.

Referring to FIG. 12, in one specific example, the cloud processor performs data deduplication processing on data related to the lawn mower self-walking in the manner described below.

In S201, the data related to the lawn mower self-walking is read.

In S02, a data type of the data related to the lawn mower self-walking is determined, if the data type is the statistical data or the historical data, step S03 is performed; if the data type is not one of the statistical data or the historical data, step S03 is performed, step S201 is performed.

In S03, deduplication screening is performed on the data related to lawn mower self-walking according to a data duplication matching rule.

In S04, after duplication matching elements are deleted, the related data is automatically merged.

In step S03, the data duplication matching rule includes a plurality of matching elements and a matching order of the matching elements. The matching elements include an electronic serial number, a data packet serial number, a start time or an end time.

In some specific examples, the matching order is to traverse the electronic serial number first, then traverse the data packet serial number, delete the data packets with the same electronic serial number and data packet serial number, and then automatically merge related data according to a preset data structure.

In another specific example, the matching order is to traverse the electronic serial number first, then traverse the start time and the end time, delete the data packets with the same electronic serial number, start time and end time, and then automatically merge related data according to the preset data structure.

Figure 13:
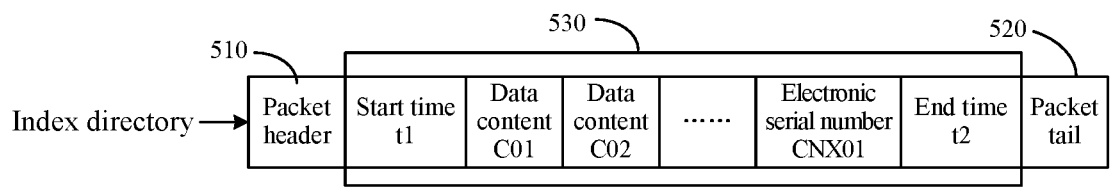
FIG. 13 shows a storage structure for storing data.
Figure 14:
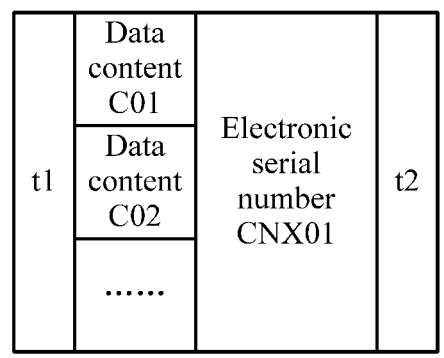
FIG. 14 shows another packet body storage structure for storing data.

As shown in FIG. 13, the data in the period from the start time t1 to the end time t2 will be continuously written to the cloud server in sequence in the same way as shown in FIG. 13 due to being affected by the turning on and off of the lawn mower every time. The cloud processor performs data deduplication processing on the data according to the process shown in FIG. 12, finally deletes the duplicated matching elements and writes data to the cloud memory according to the data structure shown in FIG. 14. In this way, the number of bytes is reduced and the memory space of memory is released.

Predictably, the deduplication method is also suitable for data stored in other storage units, which is not limited in the present disclosure.

For example, for the data related to the battery pack stored in the battery pack, when the battery pack is connected to the lawn mower and mechanical and electrical connections are established, the data related to the battery pack stored in the battery pack is transmitted to the Internet of Things module 160 of the lawn mower through the bus, and is then uploaded by the Internet of Things module 160 to the cloud server for storage. In this way, the Internet of Things module 160 does not need to be additionally added to the battery pack, and the user can also call the battery pack data stored in the cloud server through the terminal so as to quickly obtain the battery pack data information.

Figure 15:
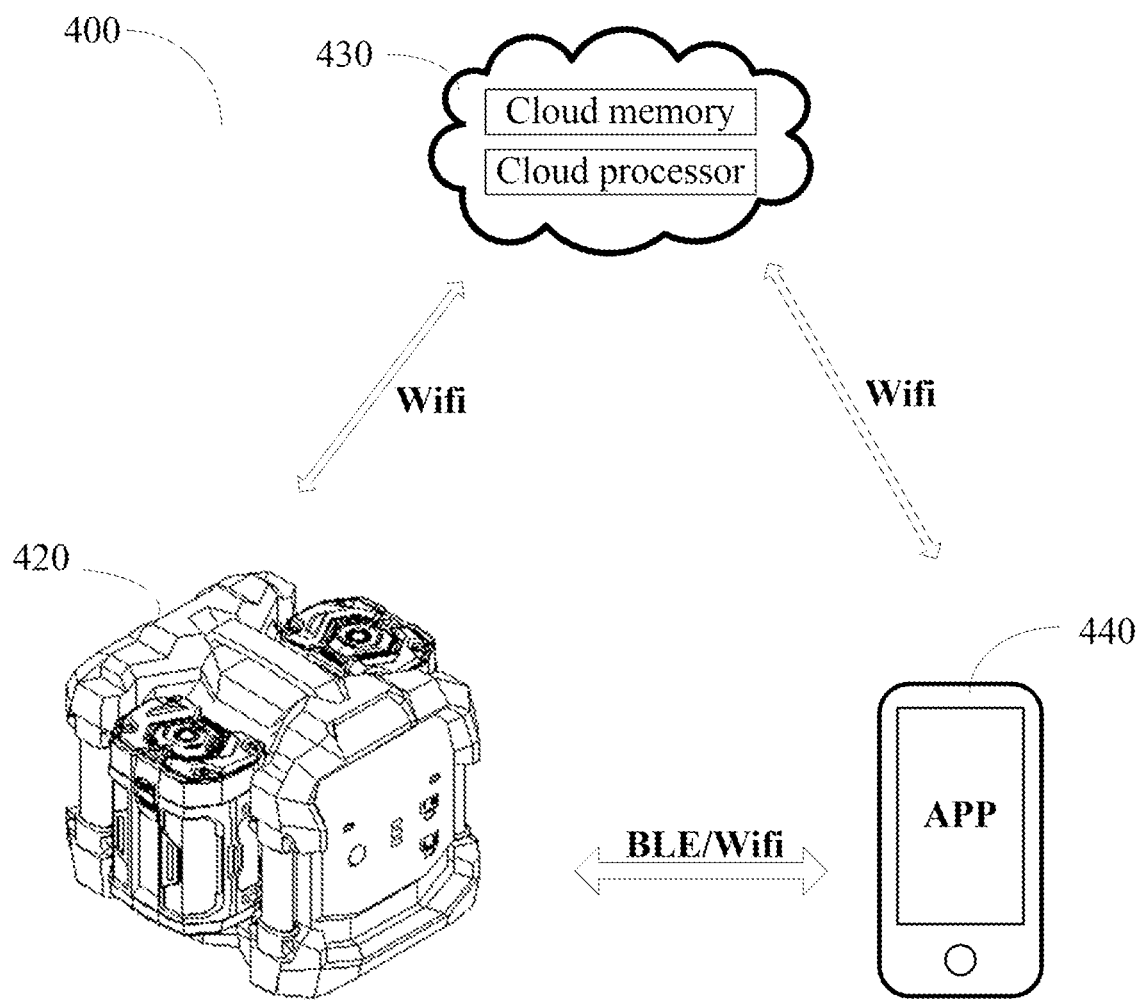
FIG. 15 is a structural view of a portable power supply system according to an example.
Figure 16:
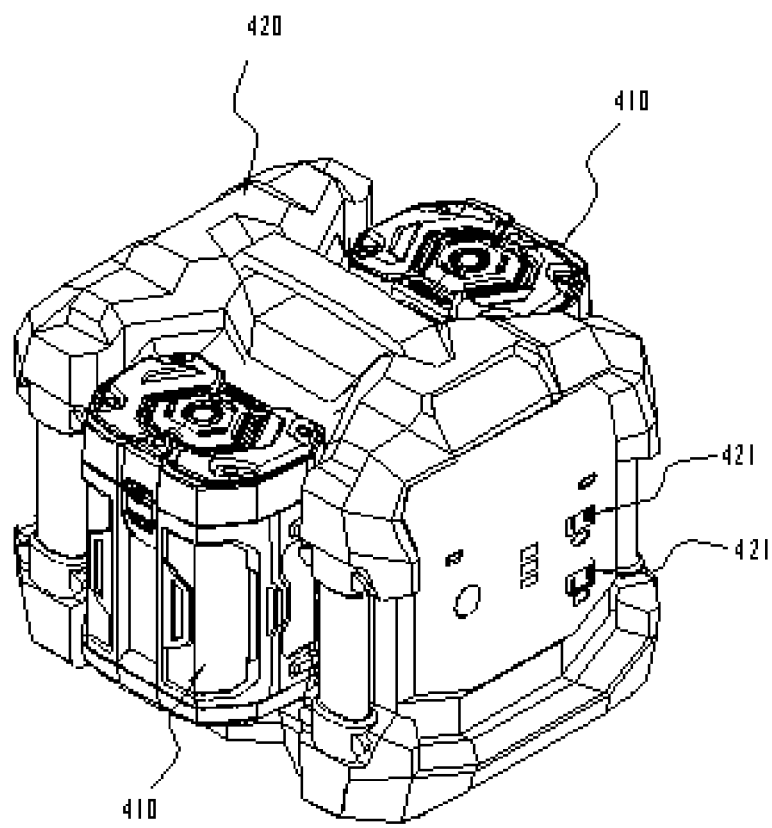
FIG. 16 is a structural view of a portable power supply of FIG. 15.

Referring to FIGS. 15 and 16, a portable power supply system 400 includes a battery pack 410, an adapter 420, a cloud server 430, and a terminal 440.

The cloud server 430 has server functions such as sending and receiving files, receiving and issuing instructions, calculation, data processing analysis, and network transmission. The cloud server 430 and an external device adopt WiFi, ZigBee, NB-IOT and other ways to achieve wireless communication. Specifically, the cloud server 430 includes a cloud memory and a cloud processor, and the cloud server 430 establishes a wireless communication link with the adapter 420 and the terminal 440, separately. The above data processing method is also applicable to the cloud server 430, which is not repeated here.

The battery pack 410 may be selectively connected to the adapter 420 to provide electric energy for the adapter 420. The battery pack 410 may also be coupled to the power tool to power the power tool.

The adapter 420 can be connected to a plurality of battery packs and configured for converting the electric energy of the battery pack into an alternating current for output. The adapter 420 includes an alternating current output interface 421 for outputting alternating current to supply electric power to an electric device. The adapter 420 includes various functional modules such as an Internet of Things module for wireless connection and transmission, an inverter module that converts the electric energy of the battery pack into the alternating current, and a battery pack coordination module for controlling the charging and discharging of each battery pack, as well as a corresponding memory and processor. The above data processing method and upgrade method for the lawn mower system can also be applied to the data storage and deduplication in the adapter 420, which will not be repeated here.

The above data processing method and upgrade method for the lawn mower system can also be applied to a charger for charging a battery pack.

The basic principles, main features and advantages of the present disclosure have been shown and described above. Those skilled in the art should understand that the above examples do not limit the present disclosure in any form, and that any technical solution obtained by means of equivalent substitution or equivalent transformation falls within the protection scope of the present disclosure.

What is claimed is:

1. A power tool system, comprising:
    a power tool;
    a battery pack detachably connected to the power tool to supply power to the power tool; and
    a cloud server capable of wirelessly communicating with the power tool;
    wherein the power tool comprises:
        a wireless communication unit configured to establish a wireless communication link with an external device; and
        a file storage unit coupled to the wireless communication unit and configured to store a content data in a preset data structure;
    wherein the preset data structure comprises:
        a packet header configured for information transmission;
        a packet tail comprising a check bit and
        a data packet body comprising a data length, a data type, a packet serial number, data content, and an electronic serial number, wherein a type of content data comprises real-time data, statistical data, historical data, or control data,
    wherein the cloud server comprises a cloud processor configured to receive the content data and perform data deduplication processing on the content data and a cloud memory configured to receive the content data subjected to the deduplication processing and store the content data subjected to the deduplication processing by the cloud processor in the preset data structure.

2. The power tool system according to claim 1, wherein the cloud processor is configured to perform the deduplication processing on the content data by determining the data type of the content data and performing deduplication screening and the deduplication processing on the content data according to a data duplication matching rule in condition that the data type of the content data is the statistical data or the historical data and wherein the data duplication matching rule comprises a plurality of matching elements and a matching order of the plurality of matching elements.

3. The power tool system according to claim 2, wherein the plurality of matching elements comprises the electronic serial number, a data serial number or a start time and the matching order of the plurality of matching elements is to traverse the electronic serial number first, and then traverse the data serial number or the start time.

4. The power tool system according to claim 2, wherein the data duplication matching rule is to automatically merge related content data according to the preset data structure after duplicate matching elements are deleted.

5. A power tool system, comprising:
a power tool;
a battery pack detachably connected to the power tool to supply power to the power tool; and
a cloud server capable of wirelessly communicating with the power tool;
wherein the power tool comprises:
a wireless communication unit configured to establish a wireless communication link with an external device; and
a file storage unit coupled to the wireless communication unit and configured to store a content data in a preset data structure;
wherein the preset data structure comprises:
a packet header configured for information transmission;
a packet tail comprising a check bit; and
a data packet body comprising a data length, a data type, a packet serial number, data content, and an electronic serial number, wherein a type of content data comprises real-time data, statistical data, historical data, or control data,
wherein the power tool further comprises a processor configured to perform deduplication processing on the content data by determining the data type of the content data and performing deduplication screening and the deduplication processing on the content data according to a data duplication matching rule in condition that the data type of the content data is the statistical data or the historical data and wherein the data duplication matching rule comprises a plurality of matching elements and a matching order of the plurality of matching elements.

6. The power tool system according to claim 5, wherein the plurality of matching elements comprises an electronic serial number, a data serial number or a start time and the matching order of the plurality of matching elements is to traverse the electronic serial number first, and then traverse the data serial number or the start time.

7. The power tool system according to claim 5, wherein the data duplication matching rule is to automatically merge related content data after duplicate matching elements are deleted.

8. The power tool system according to claim 5, further comprising a terminal wirelessly connected to the power tool and capable of remotely controlling or setting the power tool.

* * * * *